(12) United States Patent
Kim et al.

(10) Patent No.: US 10,652,578 B2
(45) Date of Patent: May 12, 2020

(54) PROCESSING OF MULTI-DIRECTIONAL IMAGES IN SPATIALLY-ORDERED VIDEO CODING APPLICATIONS

(71) Applicant: Apple Inc., Cupertino, CA (US)

(72) Inventors: Jae Hoon Kim, San Jose, CA (US); Dazhong Zhang, Milpitas, CA (US); Hang Yuan, San Jose, CA (US); Jiefu Zhai, San Jose, CA (US); Ming Chen, Cupertino, CA (US); Xiaosong Zhou, Campbell, CA (US); Chris Y. Chung, Sunnyvale, CA (US); Hsi-Jung Wu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/888,559

(22) Filed: Feb. 5, 2018

(65) Prior Publication Data

US 2019/0246141 A1    Aug. 8, 2019

(51) Int. Cl.
| | |
|---|---|
| *H04N 19/597* | (2014.01) |
| *H04N 19/70* | (2014.01) |
| *H04N 19/105* | (2014.01) |
| *H04N 19/139* | (2014.01) |
| *H04N 19/162* | (2014.01) |
| *H04N 19/167* | (2014.01) |
| *H04N 19/176* | (2014.01) |
| *H04N 19/52* | (2014.01) |

(52) U.S. Cl.
CPC ......... *H04N 19/597* (2014.11); *H04N 19/105* (2014.11); *H04N 19/139* (2014.11); *H04N 19/162* (2014.11); *H04N 19/167* (2014.11); *H04N 19/176* (2014.11); *H04N 19/52* (2014.11); *H04N 19/70* (2014.11)

(58) Field of Classification Search
CPC ........... H04N 21/6587; H04N 2013/40; H04N 21/21805; H04N 19/597
See application file for complete search history.

(56) References Cited

U.S. PATENT DOCUMENTS

| | | | |
|---|---|---|---|
| 2018/0160160 A1* | 6/2018 | Swaminathan | .... H04N 21/2662 |
| 2018/0192001 A1* | 7/2018 | Boyce | .................. H04N 19/597 |

* cited by examiner

*Primary Examiner* — Xiaolan Xu
(74) *Attorney, Agent, or Firm* — BakerHostetler

(57) ABSTRACT

Image processing techniques may accelerate coding of viewport data contained within multi-view image data. According to such techniques, an encoder may shifting content of a multi-directional image data according to the viewport location data provided by a decoder. The encoder may code the shifted multi-directional image data by predictive coding, and transmit to the decoder, the coded multi-directional image data and data identifying an amount of the shift. Doing so may move the viewport location to positions in the image data that are coded earlier than the positions that the viewport location naturally occupies and, thereby, may accelerate coding. On decode, a decoder may compare its present viewport location with viewport location data provided by the encoder with coded video data. The decoder may decode the coded video data and extract a portion of the decoded video data corresponding to a present viewport location for display.

33 Claims, 8 Drawing Sheets

PROCESSING OF MULTI-DIRECTIONAL IMAGES IN SPATIALLY-ORDERED VIDEO CODING APPLICATIONS

BACKGROUND

The present disclosure relates to coding techniques for multi-directional imaging applications.

Some modern imaging applications capture image data from multiple directions about a camera. Some cameras pivot during image capture, which allows a camera to capture image data across an angular sweep that expands the camera's effective field of view. Some other cameras have multiple imaging systems that capture image data in several different fields of view. In either case, an aggregate image may be created that merges image data captured from these multiple views.

A variety of rendering applications are available for multi-directional content. One rending application involves extraction and display of a sub-set of the content contained in a multi-directional image. For example, a viewer may employ a head mounted display and change the orientation of the display to identify a portion of the multi-directional image in which the viewer is interested. Alternatively, a viewer may employ a stationary display and identify a portion of the multi-directional image in which the viewer is interested through user interface controls. In these rendering applications, a display device extracts a portion of image content from the multi-directional image (called a "viewport" for convenience) and displays it. The display device would not display other portions of the multi-directional image that are outside an area occupied by the viewport.

In such applications, therefore, a display device receives image data that exceeds the data that is needed to be displayed. When received data is coded by video compression techniques, a decoding device may be employed to decode compressed image data of the multi-directional image in its entirety before presenting the multi-directional image to the display for rendering. Decoding such image data involves processing latencies that can delay rendering of viewport data.

Accordingly, the inventors perceive a need in the art for video coding techniques that code data of multi-directional images but avoid unnecessary latencies in generating viewport data for display applications.

DETAILED DESCRIPTION

Aspects of the present disclosure provide image processing techniques that accelerate coding of viewport data while avoiding unnecessary latencies in generating viewport data for display applications. According to such techniques, an encoder may shift content of a multi-directional image data according to the viewport location data provided by a decoder. The encoder may code the shifted multi-directional image data by predictive coding, and transmit to the decoder, the coded multi-directional image data and data identifying an amount of the shift. Doing so may move the viewport location to positions in the image data that are coded earlier than the positions that the viewport location naturally occupies and, thereby, may accelerate coding. On decode, a decoder may compare its present viewport location with viewport location data provided by the encoder with coded video data. The decoder may decode the coded video data and extract a portion of the decoded video data corresponding to a present viewport location for display.

Figure 1:
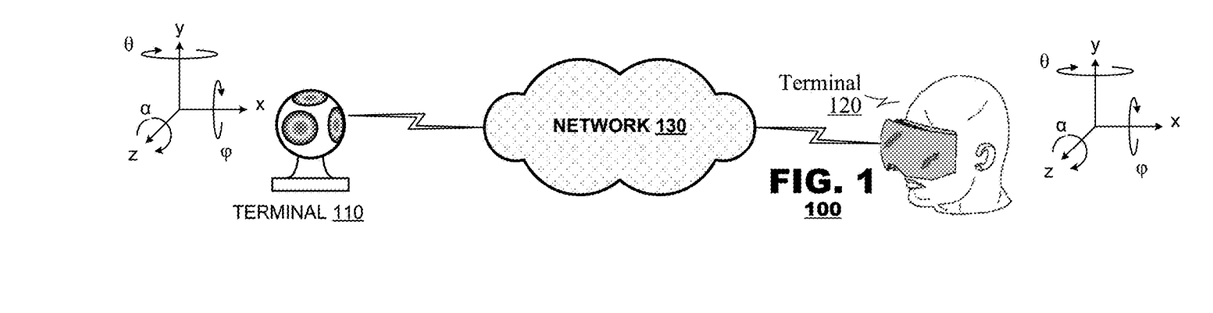
FIG. 1 illustrates a system according to an aspect of the present disclosure.

FIG. 1 illustrates a system 100 according to an aspect of the present disclosure. There, the system 100 is shown as including a source terminal 110 and a sink terminal 120 interconnected by a network 130. The source terminal 110 may transmit a coded representation of omnidirectional video to the sink terminal 120. The sink terminal 120 may receive the coded video, decode it, and display a selected portion of the decoded video.

FIG. 1 illustrates the source terminal 110 as a multi-directional camera that captures image data of a local environment before coding it. In another aspect, the source terminal 110 may receive omni-directional video from an external source (not shown), such as a streaming service or storage device.

The sink terminal 120 may determine a viewport location in a three-dimensional space represented by the multi-directional image. The sink terminal 120 may select a portion of decoded video to be displayed, for example, based on the terminal's orientation in free space. FIG. 1 illustrates the sink terminal 120 as a head mounted display but, in other aspects, the sink terminal 120 may be another type of display device, such as a stationary flat panel display, smartphone, tablet computer, gaming device or portable media player. Different types of user controls may be provided with each such display type through which a viewer identifies the viewport. The sink terminal's device type is immaterial to the present discussion unless otherwise noted herein.

The network 130 represents any number of computer and/or communication networks that extend from the source terminal 110 to the sink terminal 120. The network 130 may include one or a combination of circuit-switched and/or packet-switched communication networks. The network 130 may communicate data between the source terminal 110 and the sink terminal 120 by any number of wireline and/or wireless communication media. The architecture and operation of the network 130 is immaterial to the present discussion unless otherwise noted herein.

FIG. 1 illustrates a communication configuration in which coded video data is transmitted in a single direction from the source terminal 110 to the sink terminal 120. Aspects of the present disclosure find application with communication equipment that exchange coded video data in a bidirectional fashion, from terminal 110 to terminal 120 and also from terminal 120 to terminal 110. The principles of the present disclosure find application with both unidirectional and bidirectional exchange of video.

Figure 2:
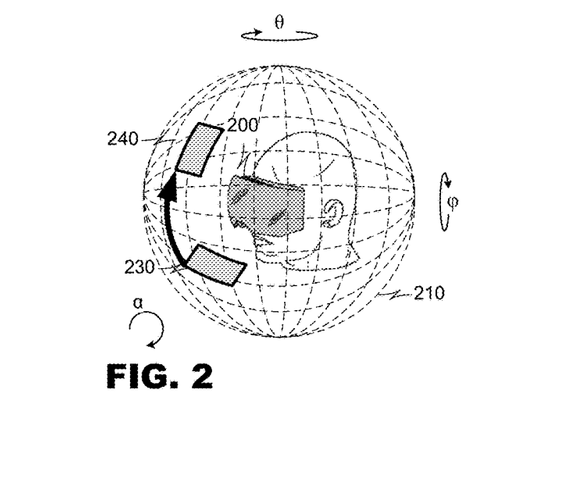
FIG. 2 figuratively illustrates a rendering application for a sink terminal according to an aspect of the present disclosure.

FIG. 2 figuratively illustrates a rendering application for a sink terminal 200 according to an aspect of the present disclosure. There, omnidirectional video is represented as if it exists along a spherical surface 210 provided about the sink terminal 200. Based on the orientation of the sink terminal 200, the terminal 200 may select a portion of the video (called, a "viewport" for convenience) and display the selected portion. As the orientation of the sink terminal 200 changes, the terminal 200 may select different portions from the video. For example, FIG. 2 illustrates the viewport changing from a first location 230 to a second location 240 along the surface 210.

Aspects of the present disclosure may apply video compression techniques according to any of a number of coding protocols. For example, the source terminal 110 (FIG. 1) may code video data according to an ITU-T coding protocol such as H.265 (HEVC), H.264 (AVC) or a predecessor coding protocol. Typically, such protocols parse individual frames of video into spatial arrays of video, called "tiles" herein, and they code the pixel blocks in a regular coding order such as a raster scan order.

Figure 3:
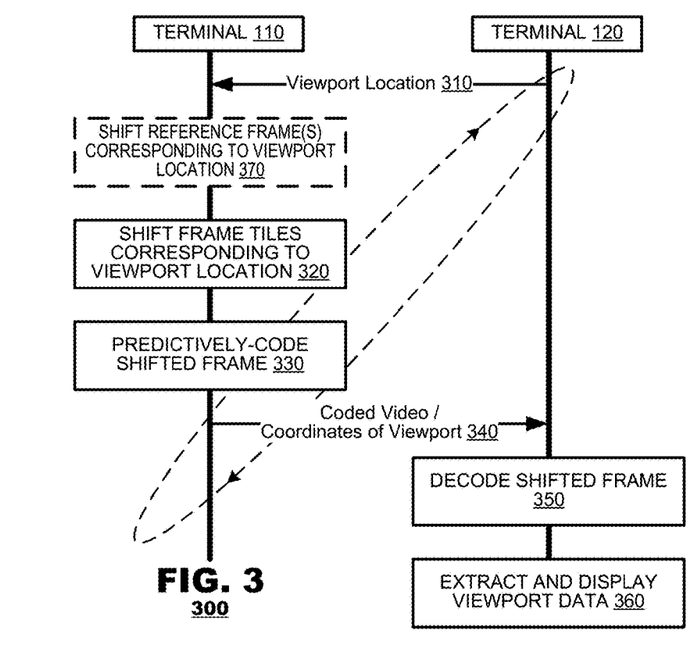
FIG. 3 illustrates a method according to an aspect of the present disclosure.

FIG. 3 illustrates a method 300 according to an aspect of the present disclosure. According to the method 300, a sink terminal 120 may transmit data to the source terminal 110 identifying a location of a viewport being displayed by the sink terminal 120 (msg. 310). Responsive to the viewport location data, the method 300 may shift tiles of the omnidirectional image in an amount corresponding to the viewport location data (box 320). The method 300 may predictively code the shifted frame (box 330) and, thereafter, transmit to the sink terminal 120 coded video of the shifted frame along with data identifying location of the viewport (msg. 340).

The sink terminal 120 may receive the coded video data and decode it (box 350). The sink terminal 120 also may extract data from the decoded frame corresponding to the viewport and display it (box 360).

The method 300 of FIG. 3 may repeat in several iterations over the course of a video coding session. It is expected that the sink terminal 120 will report its viewport location (msg. 310) at periodic intervals and, between such reports of viewport location, the source terminal 110 will code newly-received frames of a video sequence after having been shifted to account for the then-current viewport location (box 310). As described herein, predictive video coding often exploits temporal redundancy in a video sequence by representing an input frame differentially with respect to previously coded frames that are designated to serve as reference frames. In an aspect, the method 300 also may shift the reference frames to correspond to a newly-received viewport location (box 370). In this manner, alignment may be retained between the orientation of input frames and the orientation of the reference frames, which may reduce the size of motion vectors that are derived during predictive coding.

Figure 4:
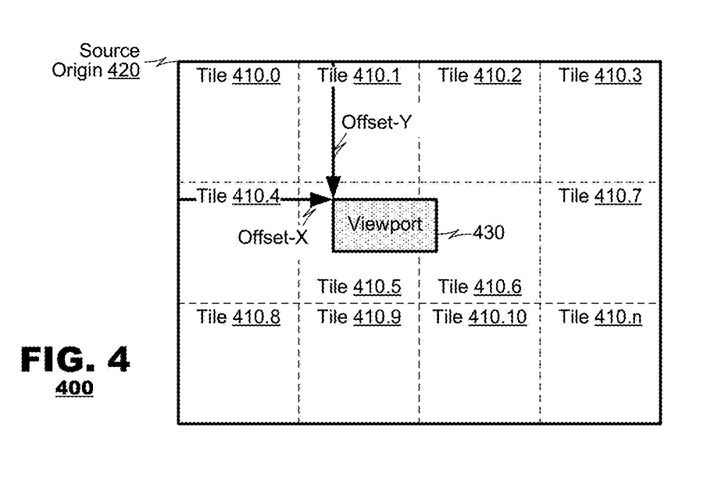
FIG. 4 illustrates a frame of omnidirectional video that may be coded by a source terminal.

FIG. 4 illustrates a frame 400 of omnidirectional video that may be coded by a source terminal 110. There, the frame 400 is illustrated as having been parsed into a plurality of tiles 410.0-410.n. Each tile is coded in raster scan order. Thus, content of tile 410.0 may be coded before content of tile 410.1, content of tile 410.1 may be coded before content of tile 410.2. The process may continue sequentially by coding each tile along a common row and advancing to code tiles in a subsequent row until a final tile 410.n of a final row of tiles is coded. Typically, the tiles 410.0-410.n are defined with reference to an origin point 420 that is defined for the source image 400.

As discussed, a sink terminal 120 (FIG. 1) may extract a viewport 430 from the frame 400, after it is coded by the source terminal 110 (FIG. 1), transmitted to the sink terminal 120 and decoded. The sink terminal 120 may display the viewport 400 locally. The sink terminal 120 may transmit to the source terminal 110 data identifying a location of the viewport 430 within an area of the frame 400. For example, the sink terminal 120 may transmit offset data, shown as offset-x and offset-y, identifying a location of the viewport 430 within the area of the frame 400.

Figure 5:
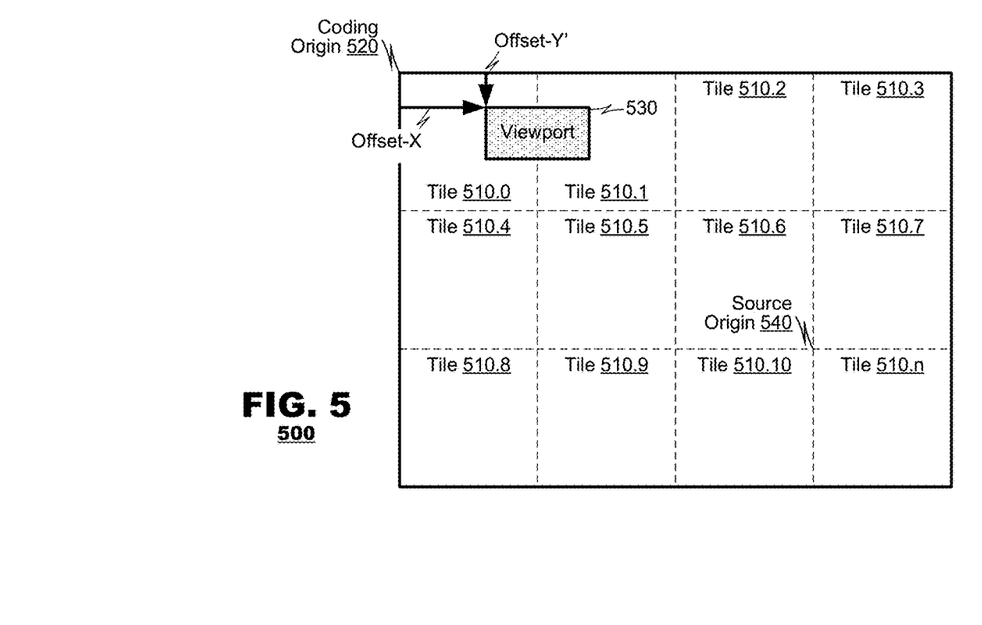
FIG. 5 illustrates a shifted frame that may be obtained by the method of FIG. 3

FIG. 5 illustrates a shifted frame 500 that may be obtained by the method 300 of FIG. 3 operating on the exemplary frame 400 of FIG. 4. In this example, the method 400 may have shifted the frame data 400 in integer numbers of tiles to locate the viewport 530 as close to an origin 520 of the frame 500 as possible. When the frame data is shifted, tile-by-tile coding processes may cause the tiles 510.0-510.3 in the first row of the shifted frame 500 to be coded first, followed by tiles 510.4-510.7 and 510.8-510.n of the succeeding rows. Shifting of the video data is expected to bring image content of the viewport 530 into the first row(s) that are coded.

Decoding of the coded video data also may proceed in raster scan order. Thus, when the coded video data of the frame 500 is decoded, decoded video data of tiles 510.0-510.3 in the first row are expected to be available before decoded video data of the tiles 510.4-510.7 and 510.8-510.n of the succeeding rows are available. In this manner, decoded video data of the viewport 530 may be obtained and displayed with reduced latency.

Shifting of data in an omnidirectional image may cause image content to "wrap" around borders of the image. Thus, when tiles 410.4-410.7 (FIG. 4) are shifted from an intermediate row position to tiles 510.0-510.3 in a top row position, tiles 410.0-410.3 that formerly occupied the top row position wrap around to a lowest position of the image. In the example of FIGS. 4 and 5, the viewport 430 is shifted by one row and, therefore, the tiles 410.0-410.3 of the top row in FIG. 4 are shifted one row position to the bottom row of tiles 510.8-510.n of FIG. 5.

Similarly, tiles may be shifted in a columnar direction, with tiles wrapping around from low columnar positions 400 in a source image to correspondingly high columnar positions in the shifted image 500. Thus, in the example of FIGS. 4 and 5, the viewport 430 may be shifted one columnar position to occupy tile 510.0 in the shifted image. Image content occupying tiles 410.0, 410.4 and 410.8 may be shifted to columnar positions 510.3, 510.7 and 510.n, respectively due to the shift. FIG. 5 illustrates a location of the source origin 540 following the shift.

When the source terminal 110 codes the shifted frame 500 (box 330, FIG. 3), the source terminal 110 may include metadata in the coded video data that identifies the location of the viewport within the coded frame. For example, as illustrated in FIG. 5, the coded video data may include Offset-X' and Offset-Y' indicators that identify a location of the viewport within the coded frame.

During operation of the method 300 of FIG. 3, communication latencies may arise that cause the viewport at the sink terminal 120 to change from the time that the sink terminal communicates the viewport location in msg 310 and the time that the sink terminal 120 displays viewport data in box 360. In one aspect, the operations of method 300 may be performed iteratively with the sink terminal 120 identifying its viewport location at various intervals and the sink terminal 120 receiving coded shifted frames in response. Moreover, the source and sink terminals 110, 120 may engage in signaling that tracks the various iterations of viewport location reports identified by a sink terminal 120 in msg. 310. In such an aspect, when a sink terminal 120 decodes a shifted frame in box 350, it may extract image content corresponding to a viewport location that exists at the time of display. For example, the sink terminal 120 may determine whether a current viewport location is different from a viewport location used by the source terminal 110 in box 320 and by how much. In this manner, the sink terminal 120 may extract and display video content for a currently-defined viewport even in the presence of communication latency.

Source devices 110 may report locations of viewports in a variety of ways. In one aspect, the viewport location may be identified using x and y offsets as illustrated in FIG. 5 (offset-x', offset-y'). In another aspect, viewport locations may be identified using rotational angles θ, φ and α (FIG. 2). Indeed, a syntax may be defined for a coding protocol to support coding by any of these techniques. One such syntax is defined in Table 1 below:

TABLE 1

| Syntax | Meaning |
|---|---|
| frame_shift | true/false to indicate frame is shifted |
| if (frame_shift) { | |
| offset_x | at defined precision, horizontal shift of frame |
| offset_y | at defined precision, vertical shift of frame |
| } else { | |
| sphere_rotated | true/false to indicate sphere is rotated |
| if (sphere_rotated) { | |
| rotation_angle_θ | at defined precision, rotation angle along x axis |
| rotation_angle_φ | at defined precision, rotation angle along y axis |
| rotation_angle_α | at defined precision, rotation angle along z axis |
| } | |
| } | |

Figure 6:
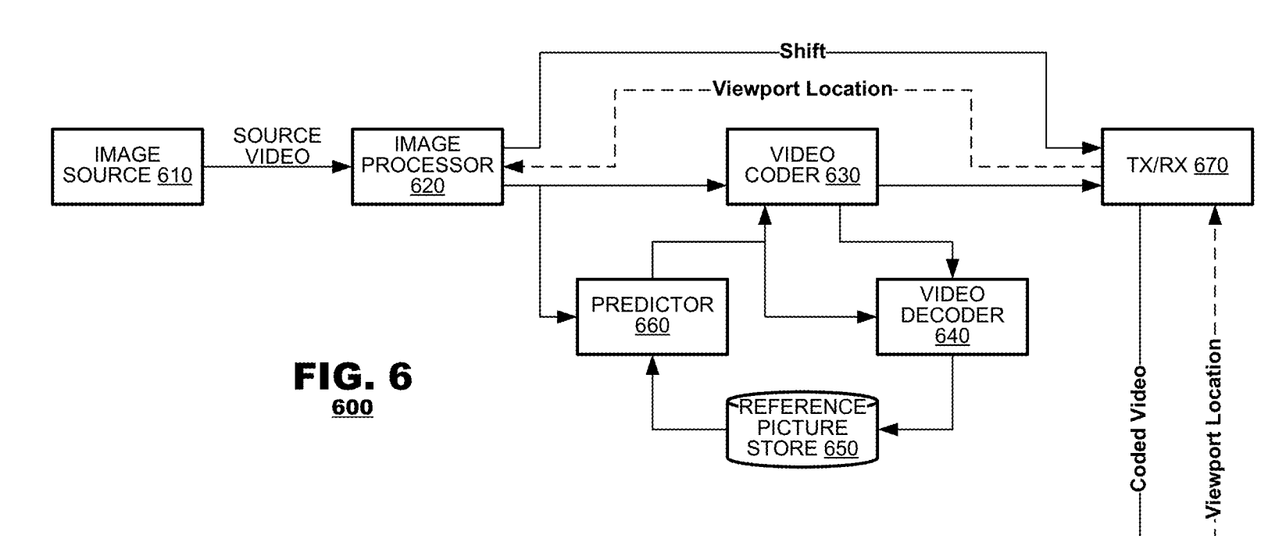
FIG. 6 is a functional block diagram of a coding system according to an aspect of the present disclosure.

FIG. 6 is a functional block diagram of a coding system 600 according to an aspect of the present disclosure. The system 600 may include an image source 610, an image processing system 620, a video coder 630, a video decoder 640, a reference picture store 650 and a predictor 660. The image source 610 may generate image data as a multi-directional image, containing image data of a field of view that extends around a reference point in multiple directions. The image processing system 620 may perform image processing operations to condition the image for coding. In one aspect, the image processing system 620 may shift content of the multi-directional image according to viewport location data as described in the foregoing discussion. The video coder 630 may generate a coded representation of its input image data, typically by exploiting spatial and/or temporal redundancies in the image data. The video coder 630 may output a coded representation of the input data that consumes less bandwidth than the original source video when transmitted and/or stored.

The video decoder 640 may invert coding operations performed by the video encoder 630 to obtain a reconstructed picture from the coded video data. Typically, the coding processes applied by the video coder 630 are lossy processes, which cause the reconstructed picture to possess various errors when compared to the original picture. The video decoder 640 may reconstruct picture of select coded pictures, which are designated as "reference pictures," and store the decoded reference pictures in the reference picture store 650. In the absence of transmission errors, the decoded reference pictures will replicate decoded reference pictures obtained by a decoder (not shown in FIG. 6).

The predictor 660 may select prediction references for new input pictures as they are coded. For each portion of the input picture being coded (called a "pixel block" for convenience), the predictor 660 may select a coding mode and identify a portion of a reference picture that may serve as a prediction reference search for the pixel block being coded. The coding mode may be an intra-coding mode, in which case the prediction reference may be drawn from a previously-coded (and decoded) portion of the picture being coded. Alternatively, the coding mode may be an inter-coding mode, in which case the prediction reference may be drawn from another previously-coded and decoded picture.

When an appropriate prediction reference is identified, the predictor 660 may furnish the prediction data to the video coder 630. The video coder 630 may code input video data differentially with respect to prediction data furnished by the predictor 660. Typically, prediction operations and the differential coding operate on a pixel block-by-pixel block basis. Prediction residuals, which represent pixel-wise differences between the input pixel blocks and the prediction pixel blocks, may be subject to further coding operations to reduce bandwidth further.

As indicated, the coded video data output by the video coder 630 should consume less bandwidth than the input data when transmitted and/or stored. The coding system 600 may output the coded video data to an output device 670, such as a transceiver, that may transmit the coded video data across a communication network 130 (FIG. 1). Alternatively, the coding system 600 may output coded data to a storage device (not shown) such as an electronic-, magnetic- and/or optical storage medium.

The transceiver 670 also may receive viewport location data from a decoding terminal (FIG. 7) and provide the viewport location data to the image processor 620.

Figure 7:
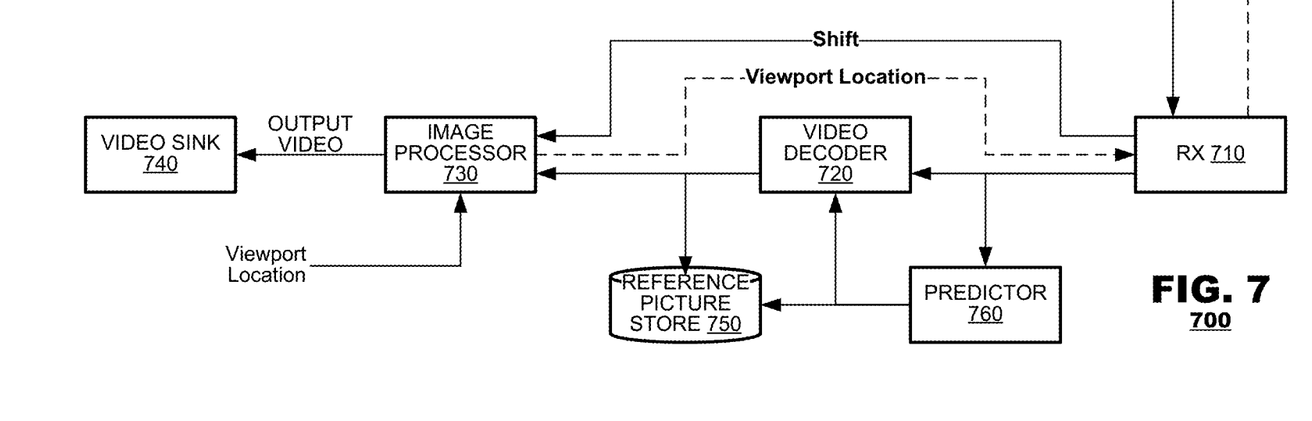
FIG. 7 is a functional block diagram of a decoding system according to an aspect of the present disclosure.

FIG. 7 is a functional block diagram of a decoding system 700 according to an aspect of the present disclosure. The decoding system 700 may include a transceiver 710, a video decoder 720, an image processor 730, a video sink 740, a reference picture store 750 and a predictor 760. The transceiver 710 may receive coded video data from a channel and route it to the video decoder 720. The video decoder 720 may decode the coded video data with reference to prediction data supplied by the predictor 760. The video decoder 720 may output decoded video data in a representation determined by an image processor 220 (FIG. 2) of a coding system that generated the coded video. The image processor 730 may extract video data from the decoded video according to the viewport orientation currently in force at the decoding system. The image processor 730 may output the extracted viewport data to the video sink device 740.

The video sink 740, as indicated, may consume decoded video generated by the decoding system 700. Video sinks 740 may be embodied by, for example, display devices that render decoded video such as, for example, video sink 120. In other applications, video sinks 740 may be embodied by computer applications, for example, gaming applications, virtual reality applications and/or video editing applications, that integrate the decoded video into their content. In some applications, a video sink may process the entire multi-directional field of view of the decoded video for its application but, in other applications, a video sink 740 may process a selected sub-set of content from the decoded video. For example, when rendering decoded video on a flat panel display, it may be sufficient to display only a selected sub-set of the multi-directional video. In another application, decoded video may be rendered in a multi-directional format, for example, in a planetarium.

The transceiver 710 also may sent viewport location data from an encoding terminal (FIG. 6) that is provided by the image processor 620.

Figure 8:
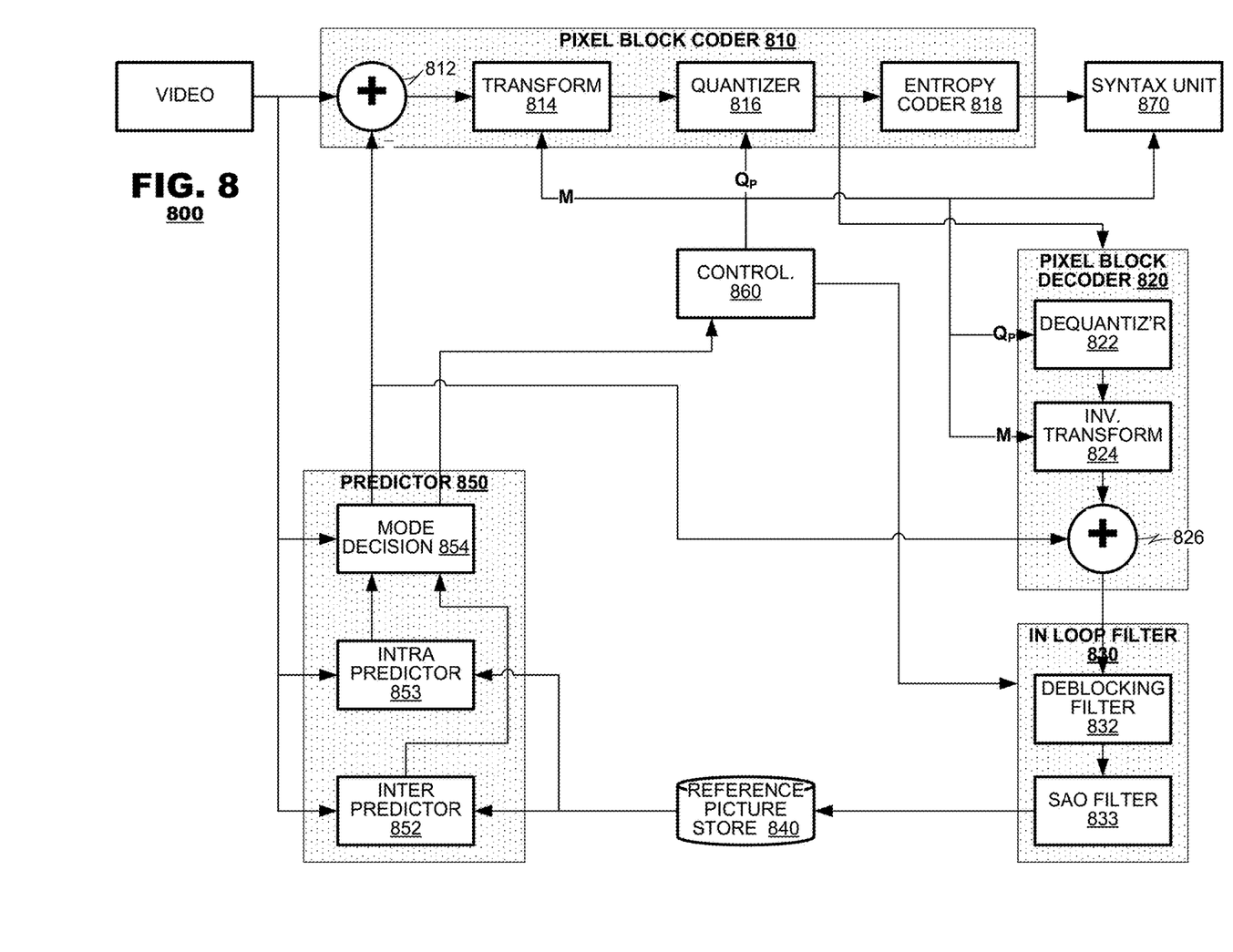
FIG. 8 is a functional block diagram of a coding system according to an aspect of the present disclosure.

FIG. 8 is a functional block diagram of a coding system 800 according to an aspect of the present disclosure. The system 800 may include a pixel block coder 810, a pixel block decoder 820, an in-loop filter system 830, a reference picture store 840, a predictor 850, a controller 860, and a syntax unit 870. The pixel block coder and decoder 810, 820 and the predictor 850 may operate iteratively on individual pixel blocks of a picture that has been shifted according to one of the foregoing embodiments. Typically, the pixel blocks will be generated by parsing tiles into smaller units for coding. The predictor 850 may predict data for use during coding of a newly-presented input pixel block. The pixel block coder 810 may code the new pixel block by predictive coding techniques and present coded pixel block data to the syntax unit 870. The pixel block decoder 820 may decode the coded pixel block data, generating decoded pixel block data therefrom. The in-loop filter 830 may perform various filtering operations on a decoded picture that is assembled from the decoded pixel blocks obtained by the pixel block decoder 820. The filtered picture may be stored in the reference picture store 840 where it may be used as a source of prediction of a later-received pixel block. The syntax unit 870 may assemble a data stream from the coded pixel block data which conforms to a governing coding protocol.

The pixel block coder 810 may include a subtractor 812, a transform unit 814, a quantizer 816, and an entropy coder 818. The pixel block coder 810 may accept pixel blocks of input data at the subtractor 812. The subtractor 812 may receive predicted pixel blocks from the predictor 850 and generate an array of pixel residuals therefrom representing a difference between the input pixel block and the predicted pixel block. The transform unit 814 may apply a transform to the sample data output from the subtractor 812, to convert data from the pixel domain to a domain of transform coefficients. The quantizer 816 may perform quantization of transform coefficients output by the transform unit 814. The quantizer 816 may be a uniform or a non-uniform quantizer. The entropy coder 818 may reduce bandwidth of the output of the coefficient quantizer by coding the output, for example, by variable length code words.

The transform unit 814 may operate in a variety of transform modes as determined by the controller 860. For example, the transform unit 814 may apply a discrete cosine transform (DCT), a discrete sine transform (DST), a Walsh-Hadamard transform, a Haar transform, a Daubechies wavelet transform, or the like. In an aspect, the controller 860 may select a coding mode M to be applied by the transform unit 815, may configure the transform unit 815 accordingly and may signal the coding mode M in the coded video data, either expressly or impliedly.

The quantizer 816 may operate according to a quantization parameter $Q_P$ that is supplied by the controller 860. In an aspect, the quantization parameter $Q_P$ may be applied to the transform coefficients as a multi-value quantization parameter, which may vary, for example, across different coefficient locations within a transform-domain pixel block. Thus, the quantization parameter $Q_P$ may be provided as a quantization parameters array.

The entropy coder 818, as its name implies, may perform entropy coding of data output from the quantizer 816. For example, the entropy coder 818 may perform run length coding, Huffman coding, Golomb coding and the like.

The pixel block decoder 820 may invert coding operations of the pixel block coder 810. For example, the pixel block decoder 820 may include a dequantizer 822, an inverse transform unit 824, and an adder 826. The pixel block decoder 820 may take its input data from an output of the quantizer 816. Although permissible, the pixel block decoder 820 need not perform entropy decoding of entropy-coded data since entropy coding is a lossless event. The dequantizer 822 may invert operations of the quantizer 816 of the pixel block coder 810. The dequantizer 822 may perform uniform or non-uniform de-quantization as specified by the decoded signal $Q_P$. Similarly, the inverse transform unit 824 may invert operations of the transform unit 814. The dequantizer 822 and the inverse transform unit 824 may use the same quantization parameters $Q_P$ and transform mode M as their counterparts in the pixel block coder 810. Quantization operations likely will truncate data in various respects and, therefore, data recovered by the dequantizer 822 likely will possess coding errors when compared to the data presented to the quantizer 816 in the pixel block coder 810.

The adder 826 may invert operations performed by the subtractor 812. It may receive the same prediction pixel block from the predictor 850 that the subtractor 812 used in generating residual signals. The adder 826 may add the prediction pixel block to reconstructed residual values output by the inverse transform unit 824 and may output reconstructed pixel block data.

The in-loop filter 830 may perform various filtering operations on recovered pixel block data. For example, the in-loop filter 830 may include a deblocking filter 832 and a sample adaptive offset ("SAO") filter 833. The deblocking filter 832 may filter data at seams between reconstructed pixel blocks to reduce discontinuities between the pixel blocks that arise due to coding. SAO filters may add offsets to pixel values according to an SAO "type," for example, based on edge direction/shape and/or pixel/color component level. The in-loop filter 830 may operate according to parameters that are selected by the controller 860.

The reference picture store 840 may store filtered pixel data for use in later prediction of other pixel blocks. Different types of prediction data are made available to the predictor 850 for different prediction modes. For example, for an input pixel block, intra prediction takes a prediction reference from decoded data of the same picture in which the input pixel block is located. Thus, the reference picture store 840 may store decoded pixel block data of each picture as it is coded. For the same input pixel block, inter prediction may take a prediction reference from previously coded and decoded picture(s) that are designated as reference pictures. Thus, the reference picture store 840 may store these decoded reference pictures.

As discussed, the predictor 850 may supply prediction data to the pixel block coder 810 for use in generating residuals. The predictor 850 may include an inter predictor 852, an intra predictor 853 and a mode decision unit 854. The inter predictor 852 may receive pixel block data representing a new pixel block to be coded and may search reference picture data from store 840 for pixel block data from reference picture(s) for use in coding the input pixel block. The inter predictor 852 may support a plurality of prediction modes, such as P mode coding and B mode coding. The inter predictor 852 may select an inter prediction mode and an identification of candidate prediction reference data that provides a closest match to the input pixel block being coded. The inter predictor 852 may generate prediction reference metadata, such as motion vectors, to identify which portion(s) of which reference pictures were selected as source(s) of prediction for the input pixel block.

The intra predictor 853 may support Intra (I) mode coding. The intra predictor 853 may search from among pixel block data from the same picture as the pixel block being coded that provides a closest match to the input pixel block. The intra predictor 853 also may generate prediction reference indicators to identify which portion of the picture was selected as a source of prediction for the input pixel block.

The mode decision unit 854 may select a final coding mode to be applied to the input pixel block. Typically, as described above, the mode decision unit 854 selects the prediction mode that will achieve the lowest distortion when video is decoded given a target bitrate. Exceptions may arise when coding modes are selected to satisfy other policies to which the coding system 800 adheres, such as satisfying a particular channel behavior, or supporting random access or data refresh policies. When the mode decision selects the final coding mode, the mode decision unit 854 may output a selected reference block from the store 840 to the pixel block coder and decoder 810, 820 and may supply to the controller 860 an identification of the selected prediction mode along with the prediction reference indicators corresponding to the selected mode.

The controller 860 may control overall operation of the coding system 800. The controller 860 may select operational parameters for the pixel block coder 810 and the predictor 850 based on analyses of input pixel blocks and also external constraints, such as coding bitrate targets and other operational parameters. As is relevant to the present discussion, when it selects quantization parameters $Q_P$, the use of uniform or non-uniform quantizers, and/or the transform mode M, it may provide those parameters to the syntax unit 870, which may include data representing those parameters in the data stream of coded video data output by the system 800. The controller 860 also may select between different modes of operation by which the system may generate reference images and may include metadata identifying the modes selected for each portion of coded data.

During operation, the controller 860 may revise operational parameters of the quantizer 816 and the transform unit 815 at different granularities of image data, either on a per pixel block basis or on a larger granularity (for example, per picture, per slice, per largest coding unit ("LCU") or another region). In an aspect, the quantization parameters may be revised on a per-pixel basis within a coded picture.

Additionally, as discussed, the controller 860 may control operation of the in-loop filter 830 and the prediction unit 850. Such control may include, for the prediction unit 850, mode selection (lambda, modes to be tested, search windows, distortion strategies, etc.), and, for the in-loop filter 830, selection of filter parameters, reordering parameters, weighted prediction, etc.

The principles of the present discussion may be used cooperatively with other coding operations that have been proposed for multi-directional video. For example, the predictor 850 may perform prediction searches using input pixel block data and reference pixel block data in a spherical projection. Operation of such prediction techniques are may be performed as described in U.S. patent application Ser. No. 15/390,202, filed Dec. 23, 2016 and U.S. patent application Ser. No. 15/443,342, filed Feb. 27, 2017, both of which are assigned to the assignee of the present application, the disclosures of which are incorporated herein by reference.

Figure 9:
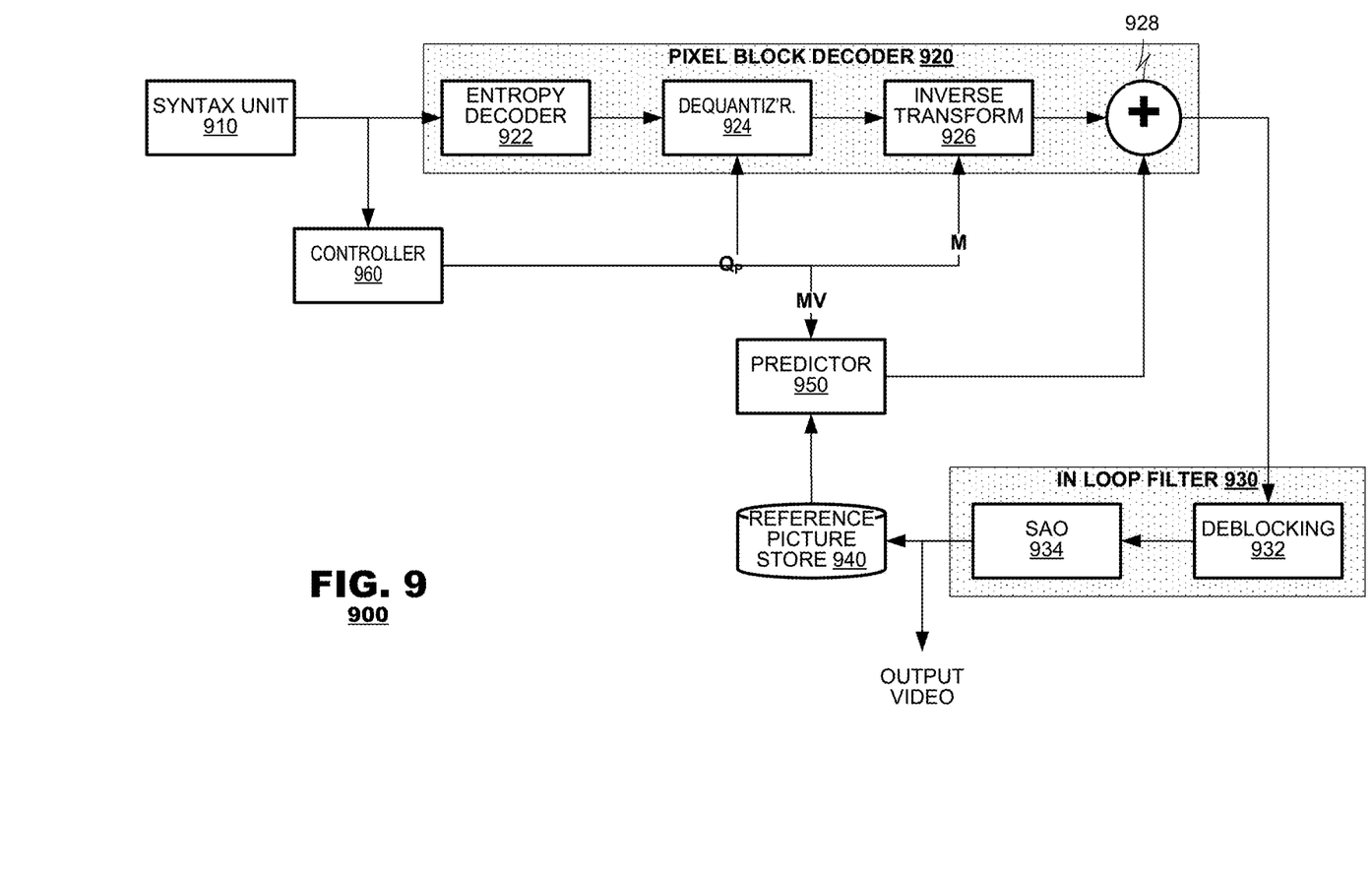
FIG. 9 is a functional block diagram of a decoding system according to an aspect of the present disclosure.

FIG. 9 is a functional block diagram of a decoding system 900 according to an aspect of the present disclosure. The decoding system 900 may include a syntax unit 910, a pixel block decoder 920, an in-loop filter 930, a reference picture store 940, a predictor 950, a controller 960 and a reformatting unit 970. The syntax unit 910 may receive a coded video data stream and may parse the coded data into its constituent parts. Data representing coding parameters may be furnished to the controller 960 while data representing coded residuals (the data output by the pixel block coder 810 of FIG. 8) may be furnished to the pixel block decoder 920. The pixel block decoder 920 may invert coding operations provided by the pixel block coder 810 (FIG. 8). The in-loop filter 930 may filter reconstructed pixel block data. The reconstructed pixel block data may be assembled into pictures for display and output from the decoding system 900 as output video. The pictures also may be stored in the prediction buffer 940 for use in prediction operations. The predictor 950 may supply prediction data to the pixel block decoder 920 as determined by coding data received in the coded video data stream.

The pixel block decoder 920 may include an entropy decoder 922, a dequantizer 924, an inverse transform unit 926, and an adder 928. The entropy decoder 922 may perform entropy decoding to invert processes performed by the entropy coder 818 (FIG. 8). The dequantizer 924 may invert operations of the quantizer 916 of the pixel block coder 810 (FIG. 8). Similarly, the inverse transform unit 926 may invert operations of the transform unit 814 (FIG. 8). They may use the quantization parameters $Q_P$ and transform modes M that are provided in the coded video data stream. Because quantization is likely to truncate data, the data recovered by the dequantizer 924, likely will possess coding errors when compared to the input data presented to its counterpart quantizer 916 in the pixel block coder 810 (FIG. 8).

The adder 928 may invert operations performed by the subtractor 810 (FIG. 8). It may receive a prediction pixel block from the predictor 950 as determined by prediction references in the coded video data stream. The adder 928 may add the prediction pixel block to reconstructed residual values output by the inverse transform unit 926 and may output reconstructed pixel block data.

The in-loop filter 930 may perform various filtering operations on reconstructed pixel block data. As illustrated, the in-loop filter 930 may include a deblocking filter 932 and an SAO filter 934. The deblocking filter 932 may filter data at seams between reconstructed pixel blocks to reduce discontinuities between the pixel blocks that arise due to coding. SAO filters 934 may add offset to pixel values according to an SAO type, for example, based on edge direction/shape and/or pixel level. Other types of in-loop filters may also be used in a similar manner. Operation of the deblocking filter 932 and the SAO filter 934 ideally would mimic operation of their counterparts in the coding system 800 (FIG. 8). Thus, in the absence of transmission errors or other abnormalities, the decoded picture obtained from the in-loop filter 930 of the decoding system 900 would be the same as the decoded picture obtained from the in-loop filter 810 of the coding system 800 (FIG. 8); in this manner, the coding system 800 and the decoding system 900 should store a common set of reference pictures in their respective reference picture stores 840, 940.

The reference picture store 940 may store filtered pixel data for use in later prediction of other pixel blocks. The reference picture store 940 may store decoded pixel block data of each picture as it is coded for use in intra prediction. The reference picture store 940 also may store decoded reference pictures.

As discussed, the predictor 950 may supply the transformed reference block data to the pixel block decoder 920. The predictor 950 may supply predicted pixel block data as determined by the prediction reference indicators supplied in the coded video data stream.

The controller 960 may control overall operation of the coding system 900. The controller 960 may set operational parameters for the pixel block decoder 920 and the predictor 950 based on parameters received in the coded video data stream. As is relevant to the present discussion, these operational parameters may include quantization parameters $Q_P$ for the dequantizer 924 and transform modes M for the inverse transform unit 910. As discussed, the received parameters may be set at various granularities of image data, for example, on a per pixel block basis, a per picture basis, a per slice basis, a per LCU basis, or based on other types of regions defined for the input image.

In an embodiment, codings of pixel blocks may be performed differently based on their relationship to the viewports reported by the decoder. Returning to FIG. 5, for example, pixel blocks (not shown) that belong to the tiles 510.0, 510.1 in which the viewport 530 is located may be performed a relatively higher quality than codings of the pixel blocks of other tiles 510.2-510.*n*. Typically, such higher quality coding is achieved by lowering quantization parameters that are used during coding, which incurs lower data loss than when higher quantization parameters are used.

Figures 10, 11, 12:
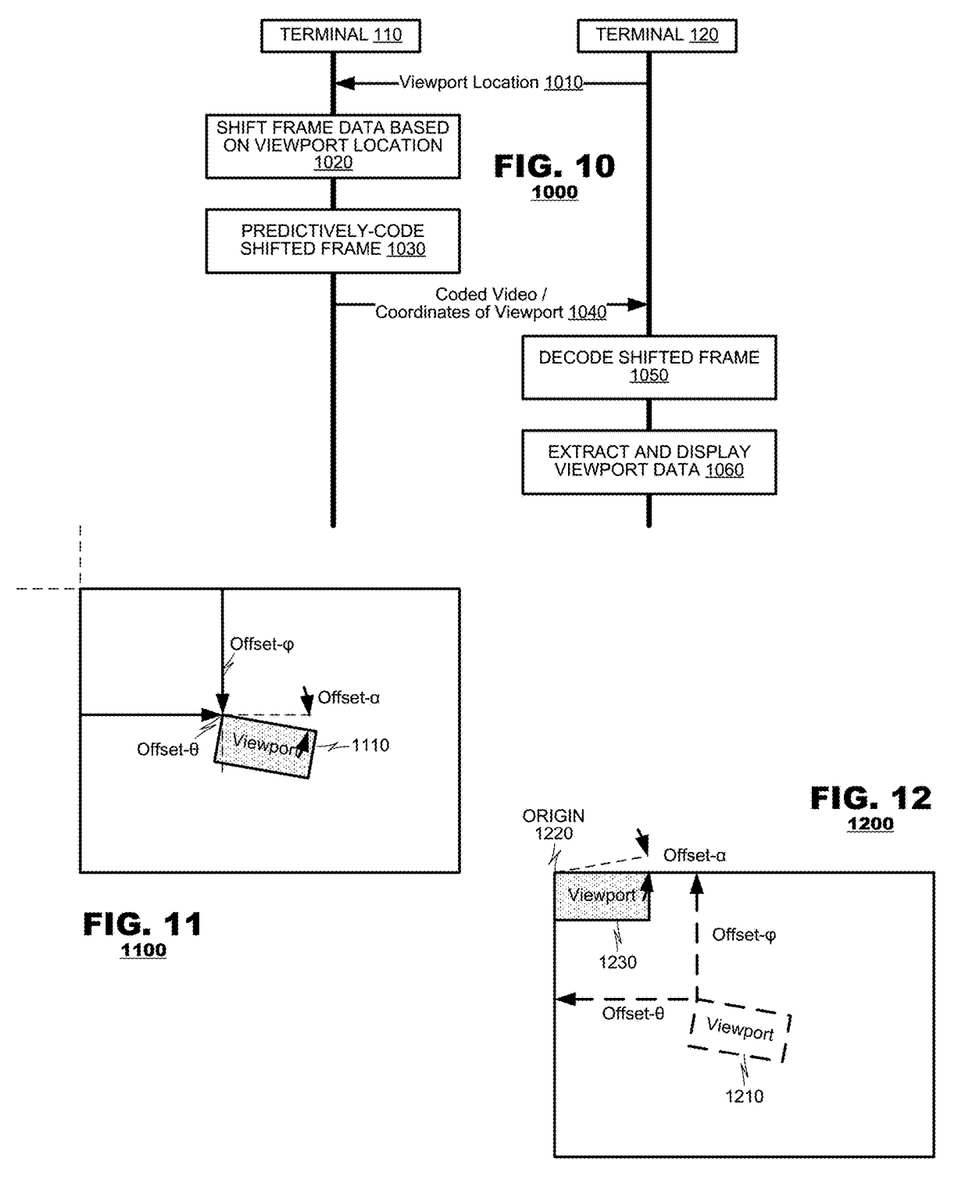
FIG. 10 illustrates a method according to an aspect of the present disclosure.
FIG. 11 illustrates a frame of omnidirectional video that may be coded by a source terminal.
FIG. 12 illustrates a shifted frame that may be obtained by the method of FIG. 10 operating on the exemplary viewport data of FIG. 11 in an aspect of the present disclosure.

FIG. 10 illustrates a method 1000 according to an aspect of the present disclosure. According to the method 1000, a sink terminal 120 may transmit data to the source terminal 110 identifying a location of a viewport being displayed by the sink terminal 120 (msg. 1010). Responsive to the viewport location data, the method 1000 may shift frame data of the omnidirectional image in an amount corresponding to the viewport location data (box 1020). The method 1000 may predictively code the shifted frame (box 1030) and, thereafter, transmit to the sink terminal 120 coded video of the shifted frame along with data identifying location of the viewport (msg. 1040).

The sink terminal 120 may receive the coded video data and decode it (box 1050). The sink terminal 120 also may extract data from the decoded frame corresponding to the viewport and display it (box 1060).

FIG. 11 illustrates a frame 1100 of omnidirectional video that may be coded by a source terminal 110. As discussed, a sink terminal 120 (FIG. 1) may extract a viewport 1110 from the frame 1100, after it is coded by the source terminal 110 (FIG. 1), transmitted to the sink terminal 120 and decoded, and display the viewport 1110 locally. The sink terminal 120 may transmit to the source terminal 110 data identifying a location of the viewport 1110 within an area of the frame 1100. In the example of FIG. 11, the sink terminal 120 may transmit offset and orientation data, shown as Offset-θ, Offset-φ and Offset-α in this example, identifying a location and orientation of the viewport 1110 within the area of the frame 1100.

FIG. 12 illustrates a shifted frame 1200 that may be obtained by the method 1000 of FIG. 10 operating on the exemplary viewport data of FIG. 11. In this example, the method 1000 may have shifted the frame data 1100 to locate the viewport 1210 at an origin 1220 of the frame 1200. Doing so causes the data of frame 1200 to be shifted according to the viewport data. Following the shift, image data formerly at the viewport 1210 location will be located at the origin 1220 of the frame 1200 (represented by viewport 1230). It is expected that video coding processes will commence by coding video data at the origin 1220 first, then proceeding in raster scan order across the frame 1200.

Decoding of the coded video data also is expected to proceed in raster scan order. Thus, when the coded video data of the frame 1200 is decoded, decoded video data will be created first for video data located proximate to the frame's origin 1220. Decoded video data of the shifted viewport 1230 should be available for display earlier than decoded video data of other portions of the display.

Although not illustrated in FIG. 10, the method 1000 also accommodates shifting of reference frames as discussed in FIG. 3.

Figure 13:
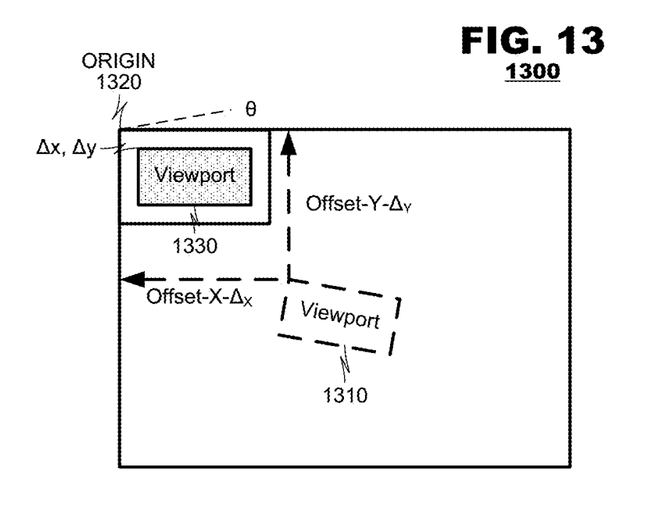
FIG. 13 illustrates a shifted frame that may be obtained by the method of FIG. 10 operating on the exemplary viewport data of FIG. 11 in another aspect of the present disclosure.

In an aspect, shown in FIG. 13, shifted viewport data may include padding data to accommodate communication latencies between source and sink devices. Using the frame data 1100 of FIG. 11, for example, viewport data 1310 is shifted to the origin 1320 of a new frame 1300 being coded, shift amounts may accommodate a padding region (shown as Δ) about a periphery of the shifted viewport 1330. Rather than shifting viewport data 1310 directly to the origin 1320 of the frame 1300, the viewport data 1310 may be shifted to a location represented by a Δx, Δy location that is proximate to the origin 1320. It is expected that, if upon decode, the actual viewport location at the decoder has moved to include data from the padding region around the shifted viewport data 1330, the decoder will have access to the padding data at an earlier point during decode of the frame 1300 than if no padding region were used. In an aspect where no padding region was used, some use cases may arise where the actual viewport location moved to include data at spatially distant locations of the frame 1300, such as a bottom region of the frame 1300 which would become available only after the frame 1300 is decoded in its entirety.

The principles of the present disclosure find application with a variety of formats of multi-directional images.

Figure 14:
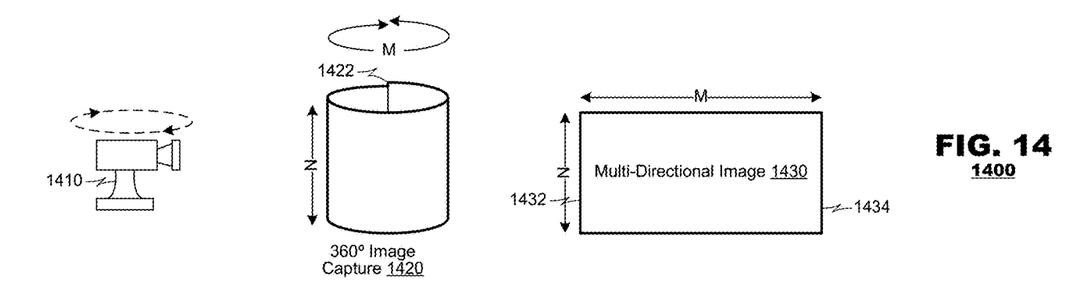
FIGS. 14-16 illustrate exemplary multi-directional image formats that are suitable with the techniques of the present disclosure.

FIG. 14 illustrates an exemplary multi-directional image format according to one aspect. The multi-directional image 1430 may be generated by a camera 1410 that pivots along an axis. During operation, the camera 1410 may capture image content as it pivots along a predetermined angular distance 1420 (preferably, a full 360°) and may merge the captured image content into a 360° image. The capture operation may yield a multi-directional image 1430 that represents a multi-directional field of view having been partitioned along a slice 1422 that divides a cylindrical field of view into a two dimensional array of data. In the multi-directional image 1430, pixels on either edge 1432, 1434 of the image 1430 represent adjacent image content even though they appear on different edges of the multi-directional image 1430.

Figure 15:
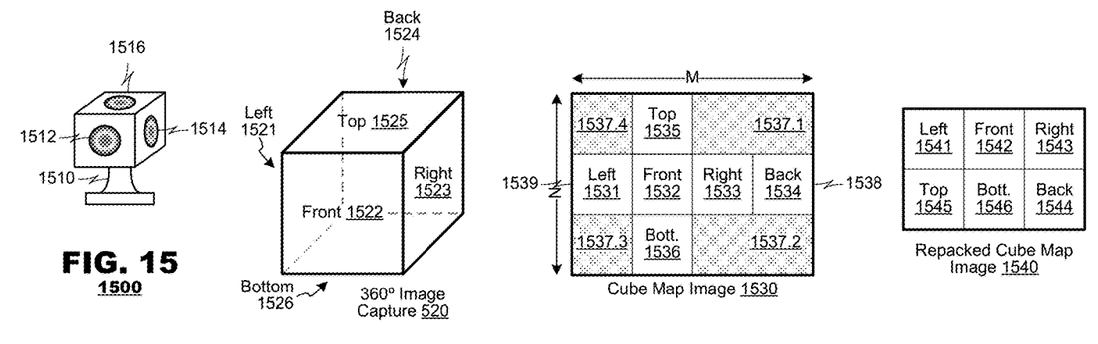

FIG. 15 illustrates an exemplary multi-directional image format according to another aspect. In the aspect of FIG. 15, a camera 1510 may possess image sensors 1512-1516 that capture image data in different fields of view from a common reference point. The camera 1510 may output a multi-directional image 1530 in which image content is arranged according to a cube map capture operation 1520 in which the sensors 1512-1516 capture image data in different fields of view 1521-1526 (typically, six) about the camera 1510. The image data of the different fields of view 1521-1526 may be stitched together according to a cube map layout 1530. In the example illustrated in FIG. 15, six sub-images corresponding to a left view 1521, a front view 1522, a right view 1523, a back view 1524, a top view 1525 and a bottom view 1526 may be captured, stitched and arranged within the multi-directional picture 1530 according to "seams" of image content between the respective views 1521-1526. Thus, as illustrated in FIG. 15, pixels from the front image 1532 that are adjacent to the pixels from each of the left, the right, the top, and the bottom images 1531, 1533, 1535, 1536 represent image content that is adjacent respectively to content of the adjoining sub-images. Similarly, pixels from the right and back images 1533, 1534 that are adjacent to each other represent adjacent image content. Further, content from a terminal edge 1538 of the back image 1534 is adjacent to content from an opposing terminal edge 1539 of the left image. The image 1530 also may have regions 1537.1-1537.4 that do not belong to any image. The representation illustrated in FIG. 15 often is called a "cube map" image.

Coding of cube map images may occur in several ways. In one coding application, the cube map image 1530 may be coded directly, which includes coding of null regions 1537.1-1537.4 that do not have image content. In such a case, when viewport image is shifted according to the techniques described in FIG. 3 or 10, the image shifts may shift viewport data into regions formerly occupied by the null region 1537.4.

In other coding applications, the cube map image 1530 may be repacked to eliminate null regions 1537.1-1537.4 prior to coding, shown as image 1540. The techniques described in FIG. 3 or 10 also may be applied to a packed image frame 1540. The image data may be shifted according to viewport location data reported by a decoder, then coded. On decode, the decoded image data may be decoded first, then shifted back according to the offsets and unpacked prior to display.

Figure 16:
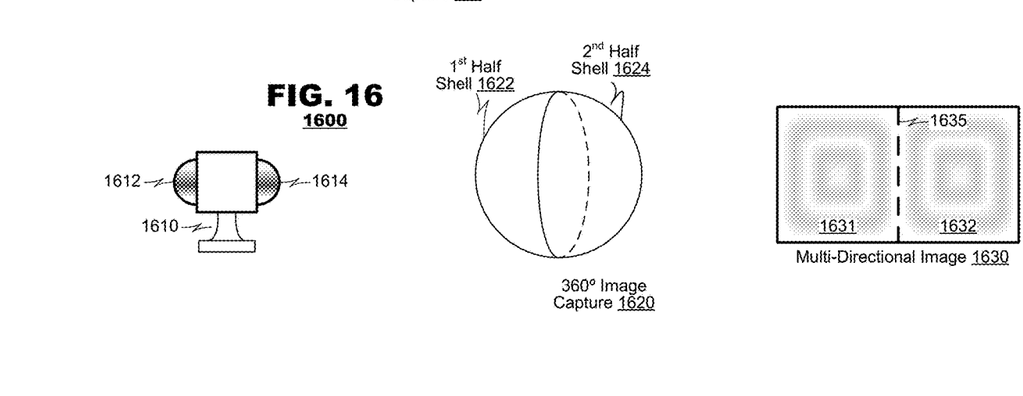

FIG. 16 illustrates another exemplary multi-directional image format 1630. The frame format of FIG. 16 may be generated by another type of omnidirectional camera 1600, called a panoramic camera. A panoramic camera typically is composed of a pair of fish eye lenses 1612, 1614 and associated imaging devices (not shown), each arranged to capture image data in a hemispherical view of view. Images captured from the hemispherical fields of view may be stitched together to represent image data in a full 360° field of view. For example, FIG. 16 illustrates a multi-directional image 1630 that contains image content 1631, 1632 from the hemispherical views 1622, 1624 of the camera and which are joined at a seam 1635. The techniques described hereinabove also find application with multi-directional image data in such formats 1630

The foregoing discussion has described operation of the aspects of the present disclosure in the context of video coders and decoders. Commonly, these components are provided as electronic devices. Video decoders and/or controllers can be embodied in integrated circuits, such as application specific integrated circuits, field programmable gate arrays and/or digital signal processors. Alternatively, they can be embodied in computer programs that execute on camera devices, personal computers, notebook computers, tablet computers, smartphones or computer servers. Such computer programs typically are stored in physical storage media such as electronic-, magnetic-and/or optically-based storage devices, where they are read to a processor and executed. Decoders commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

We claim:

1. An image coding method, comprising:
   responsive to data from a decoder identifying a location of a viewport, shifting, at an a coder, multi-directional image data to place content identified by the viewport location data at a predetermined tile position,
   coding the shifted multi-directional image data by predictive coding in a tile-by-tile order, and
   transmitting to the decoder, the coded shifted multi-directional image data and data identifying an amount of the shift.

2. The coding method of claim 1, wherein:
   the predetermined tile position corresponds to a tile that is coded earlier than a tile in which the content identified by the viewport location data would be coded without the shifting.

3. The coding method of claim 2, wherein the predictive coding of the shifted multi-directional image data codes a tile of the image that contains the viewport at a higher level of quality than the coding of a tile of the image that does not contain the viewport.

4. The coding method of claim 1, wherein the shifting places a location of the viewport at an origin of the shifted multi-directional image data, and the coding begins at the origin of the shifted multi-directional image data.

5. The coding method of claim 1, wherein the shifting places a location of the viewport at an origin of the shifted multi-directional image data offset by a padding amount, and the coding begins at the origin of the shifted multi-directional image data.

6. The coding method of claim 1, further comprising shifting a reference frame that provides a prediction reference for the predictive coding of the multi-directional image data according to the viewport location.

7. The coding method of claim 1, wherein the viewport location data represents a display condition at a decoder of a previously-coded frame.

8. The coding method of claim 1, wherein the viewport location data contains x and y offset data.

9. The coding method of claim 1, wherein the viewport location data contains angular offset data.

10. The coding method of claim 1, wherein the multi-directional image data is a cube map image.

11. The coding method of claim 1, wherein the multi-directional image data is an omni-directional image.

12. The method of claim 1, wherein the multi-directional image data has a same size before and after the shift.

13. The method of claim 1, wherein the coded multi-directional image data has size larger than the viewport.

14. The method of claim 1, wherein:
the multi-directional image data is contained within a two-dimensional array of data,
the shift causes a first translational movement of the multi-directional image data in the viewport location to a second location within the two-dimensional array, and
the shift causes image data in another location of the two-dimensional array to move to a new location across a boundary of the two-dimensional array according to the first translational movement.

15. The method of claim 1, further comprising:
decoding, by the decoder, the coded shifted multi-directional image data received from the coder,
extracting, by the decoder, a subset of data from the decoded shifted multi-directional image based on a current viewport location data and the data identifying an amount of the shift; and
displaying the extracted subset of data.

16. The decoding method of claim 15, further comprising:
storing the decoded shifted multi-directional image in a reference picture buffer, and
communicating to the coder, a location of the extracted subset of data as a new viewport location.

17. The decoding method of claim 15, wherein the decoding occurs on a tile-by-tile basis, the tiles representing different spatial areas of the decoded multi-directional image.

18. The decoding method of claim 15, wherein
the decoding begins at an origin of the shifted multi-directional image; and
the subset is extracted from a position of the decoded shifted multi-directional image that includes the origin.

19. A system comprising a coder, the coder comprising:
an image processor, responsive to data from a decoder identifying a location of a viewport, to shift a multi-directional image data, placing content identified by the viewport location data at a predetermined tile position, outputting video data comprising the shifted multi-directional image data,
a video coder having an input coupled to the video data output of the image processor, to predictively code the video data in a tile-by-tile order and
a transmitter having an input for coded video data from the video coder and for data identifying an amount of the shift applied by the image processor.

20. The coder of claim 19, wherein
the predetermined tile position corresponds to a tile that is coded earlier than a tile in which the content identified by the viewport location data would be coded without the shifting.

21. The coder of claim 19, wherein
the image processor places a location of the viewport at an origin of the shifted multi-directional image data, and
the video coder begins coding at the origin of the shifted multi-directional image data.

22. The coder of claim 19, wherein
the video comprises a reference picture buffer that stores reference frames for predictive video coding operations, and
the video coder shifts the reference frames according to the viewport location data.

23. The coder of claim 19, wherein
the image processor shifts a location of the viewport at an origin of the shifted multi-directional image data offset by a padding amount, and
the video coder begins coding at the origin of the shifted multi-directional image data.

24. The coder of claim 19, wherein the viewport location data represents a display condition at the decoder of a previously-coded frame.

25. The coder of claim 19, wherein the viewport location data contains x and y offset data.

26. The coder of claim 19, wherein the viewport location data contains angular offset data.

27. The coder of claim 19, further comprising an image source to generate the multi-directional image data as a cube map image.

28. The coder of claim 19, further comprising an image source to generate the multi-directional image data as an omni-directional image.

29. The system of claim 19, further comprising a decoder, comprising:
a receiver, having an input for the coded video comprising the shifted multi-directional image data and the data identifying an amount of the shift applied by the coder's image processor;
a video decoder having an input for the coded video comprising the shifted multi-directional image data coupled to an output of the receiver; and
an image processor to extract a subset of data from decoded shifted multi-directional image data output by the video decoder based on a current viewport location data and the data identifying an amount of the shift; and
a display to display the extracted subset of data.

30. The decoder of claim 29, wherein the video decoder includes a reference picture buffer to store the decoded shifted multi-directional image, and
the decoder comprises a transceiver to communicate to the coder, a location of the extracted subset of data as a new viewport location.

31. The decoder of claim 29, wherein the video decoder operates on a tile-by-tile basis, the tiles representing different spatial areas of the decoded multi-directional image.

32. The decoder of claim 29, wherein
the video decoder begins decoding at an origin of the shifted multi-directional image; and
the decoder's image processor extracts the subset from a position of the decoded shifted multi-directional image that includes the origin.

33. The decoder of claim 29, wherein the decoder is a head mounted display.

* * * * *